UNITED STATES PATENT OFFICE.

GERALD H. ALLEN AND WILLIAM H. ALLEN, OF DETROIT, MICHIGAN; SAID GERALD H. ALLEN ASSIGNOR TO SAID WILLIAM H. ALLEN.

RUST-PREVENTING COATING.

1,305,331.  Specification of Letters Patent.  Patented June 3, 1919.

No Drawing.  Application filed February 20, 1918.  Serial No. 218,364.

*To all whom it may concern:*

Be it known that we, GERALD H. ALLEN and WILLIAM H. ALLEN, citizens of the United States, and residents of Detroit, in the county of Wayne and State of Michigan, have invented a new and Improved Rust-Preventing Coating, of which the following is a specification.

This invention relates to the art of preventing the rusting of surfaces of iron and steel containing sulfur in combination, by coating these surfaces with an unstable chemical which will cause the oxids of sulfur, formed by the oxidation of said sulfur in combination with the iron, to combine, as rapidly as the oxids are formed, with the coating chemical and convert said oxids into stable inactive compounds.

Compounds of silicon and iron, phosphorus and iron, and manganese and iron, marketed under the names of ferro-silicon, ferro-phosphorus and ferro-manganese, do not oxidize when wetted and exposed to the air to any appreciable extent, while ferrous sulfids rapidly turn red through the oxidation of the iron when so treated.

If normally insoluble barium phosphates, $Ba_3(Po_4)_2$, $BaHPO_4$., and water be brought in contact with ferrous sulfid, the latter does not turn red through the oxidation of the iron in combination with the sulfur. Furthermore, articles of iron and steel, particularly cold rolled or open hearth sheets, which are already red with thin rust when coated with barium phosphates and moistened, slowly lose their red color, which disappears by reason of the oxid being changed to what is probably phosphate of iron, after which there is no rusting.

In practice neither oils, resins or fats are used as vehicles for the barium phosphate as these would interfere with the ionization of the phosphates when wetted with rain water or condensed moisture, but we employ a vehicle which will permit the passage of water through the coating of barium phosphate and yet have sufficient adhesive properties to hold the phosphates against the surface of the metal. The preferred vehicles are casein, glue, silicate of soda, and barium hydrate although any other adherent vehicle of the same general character which is inert to the metal may be employed. The ground barium phosphate is mixed with the vehicle to the consistency of a thin paint and either brushed, sprayed or otherwise applied to the surface to be treated. The metallic radical in the barium phosphates may be replaced by any other metal whose sulfates are insoluble or substantially insoluble in water, particularly strontium or lead, but these two do not function as well as barium.

We claim:—

1. A coating for protecting surfaces of iron and steel comprising an adherent vehicle which is inert to the metal capable of absorbing water and barium phosphate.

2. A coating for protecting surfaces of iron and steel comprising an adherent vehicle which is inert to the metal capable of absorbing water and the phosphate of a metal whose sulfate is insoluble in water.

3. A coating for protecting surfaces of iron and steel comprising casein and barium phosphate.

4. A coating for protecting surfaces of iron and steel comprising casein and the phosphate of a metal whose sulfate is insoluble in water.

G. H. ALLEN.
WILLIAM H. ALLEN.